United States Patent
Grabinger

(10) Patent No.: US 7,492,233 B2
(45) Date of Patent: Feb. 17, 2009

(54) PRECISION MODULATED CONTROLLER OUTPUT

(75) Inventor: Cory L. Grabinger, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 249 days.

(21) Appl. No.: 10/908,175

(22) Filed: Apr. 29, 2005

(65) Prior Publication Data

US 2006/0244432 A1 Nov. 2, 2006

(51) Int. Cl.
*H03K 7/08* (2006.01)

(52) U.S. Cl. ..................................................... 332/109

(58) Field of Classification Search ................. 332/109, 332/106, 108, 149, 150, 151, 152, 155, 176
See application file for complete search history.

(56) References Cited

U.S. PATENT DOCUMENTS

| | | | |
|---|---|---|---|
| 4,841,198 A | 6/1989 | Wilhelm | |
| 5,105,067 A * | 4/1992 | Brekkestran et al. | 219/497 |
| 5,182,527 A | 1/1993 | Nakanishi et al. | |
| 5,404,094 A | 4/1995 | Green et al. | |
| 5,436,592 A * | 7/1995 | Schlegl | 330/10 |
| 5,504,306 A | 4/1996 | Russell et al. | |
| 5,677,476 A * | 10/1997 | McCarthy et al. | 73/29.01 |
| 5,812,605 A * | 9/1998 | Smith et al. | 375/308 |
| 5,925,278 A | 7/1999 | Hirst | |
| 6,091,213 A | 7/2000 | Park | |
| 6,222,922 B1 * | 4/2001 | Scott et al. | 379/377 |
| 6,263,450 B1 | 7/2001 | Predko | |
| 6,388,499 B1 * | 5/2002 | Tien et al. | 327/333 |
| 6,396,137 B1 * | 5/2002 | Klughart | 257/691 |
| 6,421,382 B1 | 7/2002 | Hayakawa | |
| 6,597,735 B1 | 7/2003 | Baba | |
| 6,967,541 B2 * | 11/2005 | Hooley | 332/109 |
| 7,016,204 B2 * | 3/2006 | Yang et al. | 363/21.13 |
| 7,239,116 B2 * | 7/2007 | Tang | 323/282 |
| 2003/0006902 A1 * | 1/2003 | Tullis et al. | 340/617 |
| 2006/0050064 A1 * | 3/2006 | Chen et al. | 345/204 |
| 2006/0220730 A1 * | 10/2006 | Lobb et al. | 327/540 |

* cited by examiner

*Primary Examiner*—Shawn Riley

(57) ABSTRACT

A modulating controller for use in providing a precision modulating output is disclosed. An illustrative modulating controller may include a voltage regulator adapted to output a single reference voltage, at least one modulating circuit adapted to convert a pulse-width modulated signal of the controller into a precision-controlled amplitude signal, and a modulating output driver for providing a modulating output to one or more modulating components. Illustrative methods of producing a modulating output are also disclosed herein.

20 Claims, 6 Drawing Sheets

PRECISION MODULATED CONTROLLER OUTPUT

FIELD

The present invention relates generally to the field of controllers and controller hardware. More specifically, the present invention pertains to devices and methods for providing a precision modulating output.

BACKGROUND

Controllers are frequently used in industrial and agricultural control applications to regulate and monitor parameters such as temperature, pressure, flow rate, level, and/or position. In HVAC systems, for example, such controllers are often used in conjunction with an air handling system to control the positioning of one or more actuator components for regulating the air flow distribution and/or air quality within a building or structure. Examples of such HVAC actuator components may include, but are not limited to, fan motors, dampers, compressors, air dryers, heaters, coolers, filters, humidifiers, and/or dehumidifiers.

The control of such actuator components is typically accomplished using a number of pneumatically and/or electrically actuated control valves, which can be actuated between an on-off position, between multiple discrete positions, or across an infinite range of positions. In the control of water temperature in a heat exchanger, for example, a two-position or modulating control valve such as a butterfly valve may be utilized to regulate the flow and/or temperature of hot water delivered through the exchanger. Other actuator components such as globe valves, zone valves, ball valves, solenoid valves, etc. may be similarly provided to control other aspects of the air handling system, as needed. In other applications, such actuator components may include devices such as temperature sensors, pressure sensors, flow rate sensors, liquid level sensors, proximity sensors, etc., which can be utilized in some industrial sensing applications to sense parameters within a duct, pipe, building or other desired location.

To provide a modulating output for those actuator components configured to accept a modulated control signal, a modulating controller is typically used to convert a duty cycle signal produced by the controller's microprocessor into an modulated analog output signal that can be used to directly interface with one or more modulated actuator components. In the control of modulated dampers and valves used in some HVAC systems, for example, a modulating controller or controller sub-base may be used to provide a modulated controller output of between 4 to 20 milliamps (mA) and 2 to 10 volts. While these control parameters are popular ranges for many modulated dampers and valves used in HVAC systems, other ranges and/or output types other than the standard 4-20 mA controller output can be provided.

To generate an analog modulated output signal (e.g. 4-20 mA), many controllers utilize microprocessors that are configured to output a pulse-width modulated (PWM) signal that is then fed to a digital to analog (D/A) conversion circuit. Special analog driver circuits may then be utilized to provide the desired modulated output (e.g. 4-20 mA) to each modulated actuator component. The use of D/A converters and special analog circuitry to provide the modulating output is often expensive, adding to the complexity of the microprocessor and associated drive electronics. In some cases, the heat generated by such electrical components can also affect the performance of the device, requiring the use of additional heat sinks and/or control circuitry to reduce heat. As such, many controllers must first be calibrated at the factory and/or on-site to ensure proper operation with the other system components.

SUMMARY

The present invention relates to a modulating controller for use in providing a precision modulating output, such as a 4-20 mA output, to one or more modulating components. A modulating controller in accordance with an illustrative embodiment of the present invention may include a relatively high precision voltage regulator adapted to output a single reference voltage, at least one modulating circuit adapted to convert a pulse-width modulated signal outputted from the controller into a precision-controlled amplitude signal, and a modulating output driver for providing a modulating output to one or more modulating components. Each channel of the modulating circuit may include a buffer that is referenced to the single relatively high precision voltage regulator source, which can then produce a precision-controlled modulating amplitude signal. In certain embodiments, for example, a CMOS voltage regulator capable of outputted a relatively precise voltage (e.g. ±5%, ±2%, ±1%, or less) can be coupled to each of the buffers, producing a relatively precise modulating signal that, when amplified via the modulating output drivers, can be used to supply an accurate modulating output to the modulating devices.

An illustrative method of producing a modulating output from a pulse-width modulated signal outputted by a controller may include the steps of providing a modulating circuit including a buffer referenced to a reference voltage, buffering the pulse-width modulated signal using the buffer to produce a precision-controlled amplitude signal, and then amplifying the precision-controlled amplitude signal and outputting a modulating output signals to one or more modulating components. In some embodiments, various filtering techniques can be employed to condition the modulating signal, if desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of devices and methods are illustrated in the various views, those skilled in the art will recognize that many of the examples provided have suitable alternatives that can be utilized. Moreover, while the various views are described specifically with respect to HVAC systems, it should be understood that the devices and methods described herein could be applied to the control of other types of systems, if desired.

Figure 1:
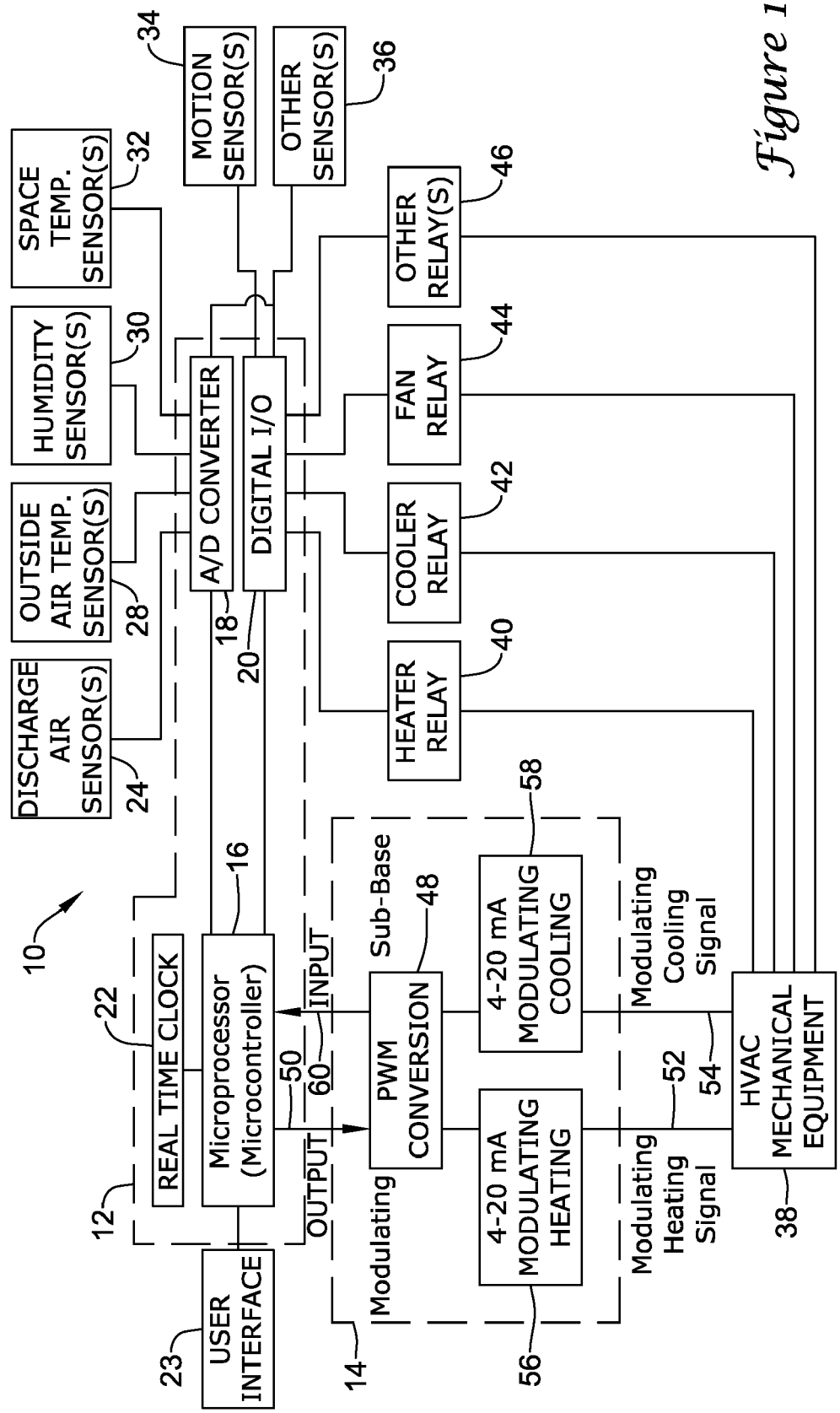
FIG. 1 is a schematic view showing an illustrative system employing a modulating controller and controller sub-base.

FIG. 1 is a schematic view showing an illustrative system 10 employing a modulating controller 12 and controller sub-base 14. Controller 12, illustratively a thermostatic controller for use in an HVAC system, may include a microprocessor 16, an analog-to-digital (A/D) converter block 18, a digital input/output (I/O) block 20, and a real-time clock 22 for providing signals to the microprocessor 16 as well as other system components. The microprocessor 16 may contain various hardware and software instructions that control the interface between the A/D converter block 18, the digital I/O block 20, and a user interface 23. In some embodiments, the microprocessor 16 may include a microcontroller having various scheduling and configuration algorithms, a memory unit (e.g. RAM, ROM, etc.), an internal clock, as well as other built-in functionality, as desired.

The A/D converter block 18 can be coupled to one or more external sensors that can be tasked to measure various environmental parameters within the system 10. In the illustrative embodiment of FIG. 1, for example, the controller 12 is shown connected to a discharge air sensor 24, an outside air temperature sensor 26, a humidity sensor 28, and a space temperature sensor 30, each of which can be controlled via the microprocessor 16 to detect various environmental parameters within a building or structure. A motion sensor 34 as well as one or more other sensors 36 (e.g. fire detector, smoke detector, carbon monoxide detector, etc.) can also be connected to the controller 12 via either the A/D converter block 18 or the digital I/O block 20, if desired.

The controller 12 can be configured to provide a number of relay signals that can be used to control various HVAC mechanical equipment 38 used by the system 10. As shown in FIG. 1, for example, the controller 12 can be connected via the digital I/O block 20 to a heater relay 40, a cooler relay 42, a fan relay 44, as well as one or more other relays 46 that can be used to actuate a heater, condenser, damper valve, and/or other modulated HVAC components employed by the system 10. The number and type of relays employed by the system 10 may vary, however, depending on the application.

The modulating sub-base 14 can be configured to provide a number of modulated signals to the HVAC mechanical equipment 38, as needed. In certain embodiments, and as described in greater detail below with respect to FIGS. 2-5, a pulse-width modulation (PWM) conversion circuit 48 can be configured to convert a duty cycle output signal 50 received from the microprocessor 16 into a 4-20 mA modulating signal. The 4-20 mA modulating signal may then be fed to the HVAC mechanical equipment 38 as modulating heating and cooling output signals 52, 54 using a 4-20 mA modulating heating interface 56 and 4-20 mA modulating cooling interface 58, as shown. An input signal 60 received from the modulating sub-base 14 may contain various status and operational information about the modulating sub-base 14. If desired, other signals received from the HVAC mechanical equipment 38 as well as from other external devices may also be fed to the controller 12 via the modulating sub-base 14. While a separate modulating controller sub-base 14 is shown in the illustrative embodiment of FIG. 1, it should be understood that the controller 12 and controller sub-base 14 could be packaged together as a single unit, if desired. In certain embodiments, for example, the controller 12 and controller sub-base 14 can both be contained on a single circuit board disposed within the controller housing.

Figure 2:
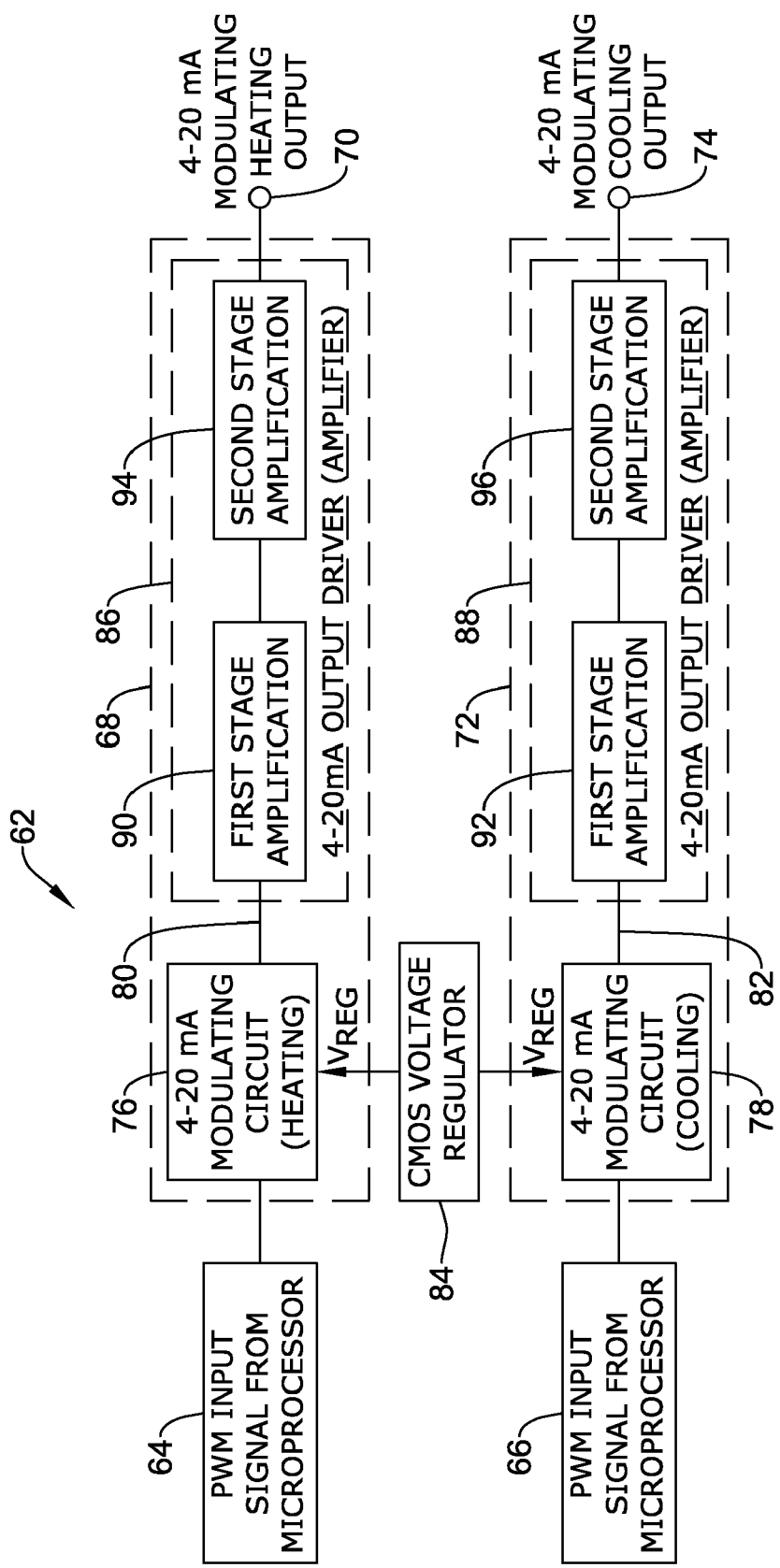
FIG. 2 is a schematic view of an illustrative PWM conversion circuit for use in converting a PWM control signal into a 4-20 mA modulating signal.

Referring now to FIG. 2, an illustrative pulse width modulation (PWM) conversion circuit 62 in accordance with an exemplary embodiment of the present invention will now be described. As shown in FIG. 2, the PWM conversion circuit 62 can be configured to convert a number of PWM input signals received from a microprocessor (e.g. the microprocessor 16 of FIG. 1) into a number of 4-20 mA modulating outputs (or other desired range) that can be utilized to control one or more modulating components. In certain embodiments, and as shown in FIG. 2, for example, a first PWM input signal 64 received from the microprocessor can be fed through a first channel of the PWM conversion circuit 62 (represented generally by dashed box 68) and converted into a modulating heating output 70 that can be used to control a modulating heater unit of an HVAC system. A second PWM input signal 66 received from the microprocessor, in turn, can be fed through a second channel of the PWM conversion circuit 62 (represented generally by dashed box 72) and converted into a modulating cooling output 74 that can be used to control a modulating cooler unit of an HVAC system. While a dual channel 68, 72 configuration is specifically depicted in FIG. 2, it should be understood that the PWM conversion circuit 62 could be scaled to accommodate a greater or lesser number of channels for providing modulating outputs to other HVAC components, as needed. If, for example, the HVAC system employs a modulated damper valve for controlling air distribution within a building or structure, then the PWM conversion circuit 62 could include an additional channel for providing a modulating damper signal to the damper valve.

A separate 4-20 mA modulating output circuit 76, 78 can be provided for each channel 68, 72 of the PWM conversion circuit 62 to condition the PWM input signals 64, 66 received from the microprocessor, producing a corresponding digital signal 80, 82 having a precisely controlled amplitude that can then be used to accurately output a modulating 4-20 mA current. To condition the PWM input signals 64, 66, a voltage regulator 84 capable of producing a regulated reference voltage $V_{REG}$ can be fed to a buffer (e.g. a non-inverting buffer, voltage level shifting buffer, etc.), producing a digital signal 80, 82 with an amplitude that has a relatively high precision in comparison to the PWM input signals 64, 66. In some controllers, the PWM input signal 64, 66 outputted from the microprocessor will have a PWM frequency of about 20 kHz with loose tolerances that can vary by as much as ±10%. By buffering the PWM input signals 64, 66 using a relatively precise voltage regulator 84 having relatively tight tolerances (e.g. ±5%, ±2%, ±1%, or less), each of the channels 68, 72 can be referenced to a single precision voltage $V_{REG}$, obviating the need for expensive D/A converters, sample and hold hardware, and in some cases, multiple precision voltage references. The heat typically associated with operating such hardware can also be significantly reduced since only a single reference is provided for all of the channels 68, 72, thus reducing heat buildup that can affect system performance.

Once the PWM input signals 64, 66 have been referenced to the regulated voltage $V_{REF}$, the signal outputs 80, 82 from each modulating output circuit 76, 78 can be filtered using a low-pass filter and then fed to a 4-20 mA output driver (amplifier) 86, 88 that provides the modulating output to the HVAC mechanical equipment. As shown in FIG. 2, each of the 4-20 mA output drivers 86, 88 can comprise a multi-stage amplifier having a first amplification stage 90, 92 and a second amplification stage 94, 96. The first amplification stage 90, 92 of each 4-20 mA output driver 86, 88 can be configured to re-reference the signal 80, 82 outputted by the modulating output circuits 76, 78 to another (e.g. stepped up) voltage range. The second amplification stage 94, 96 of each 4-20 mA output driver 86, 88, in turn, can be configured to amplify the rereferenced voltage signal received from the first amplification stage 90,92 into the desired 4-20 mA modulated outputs 70,74.

Figure 3:
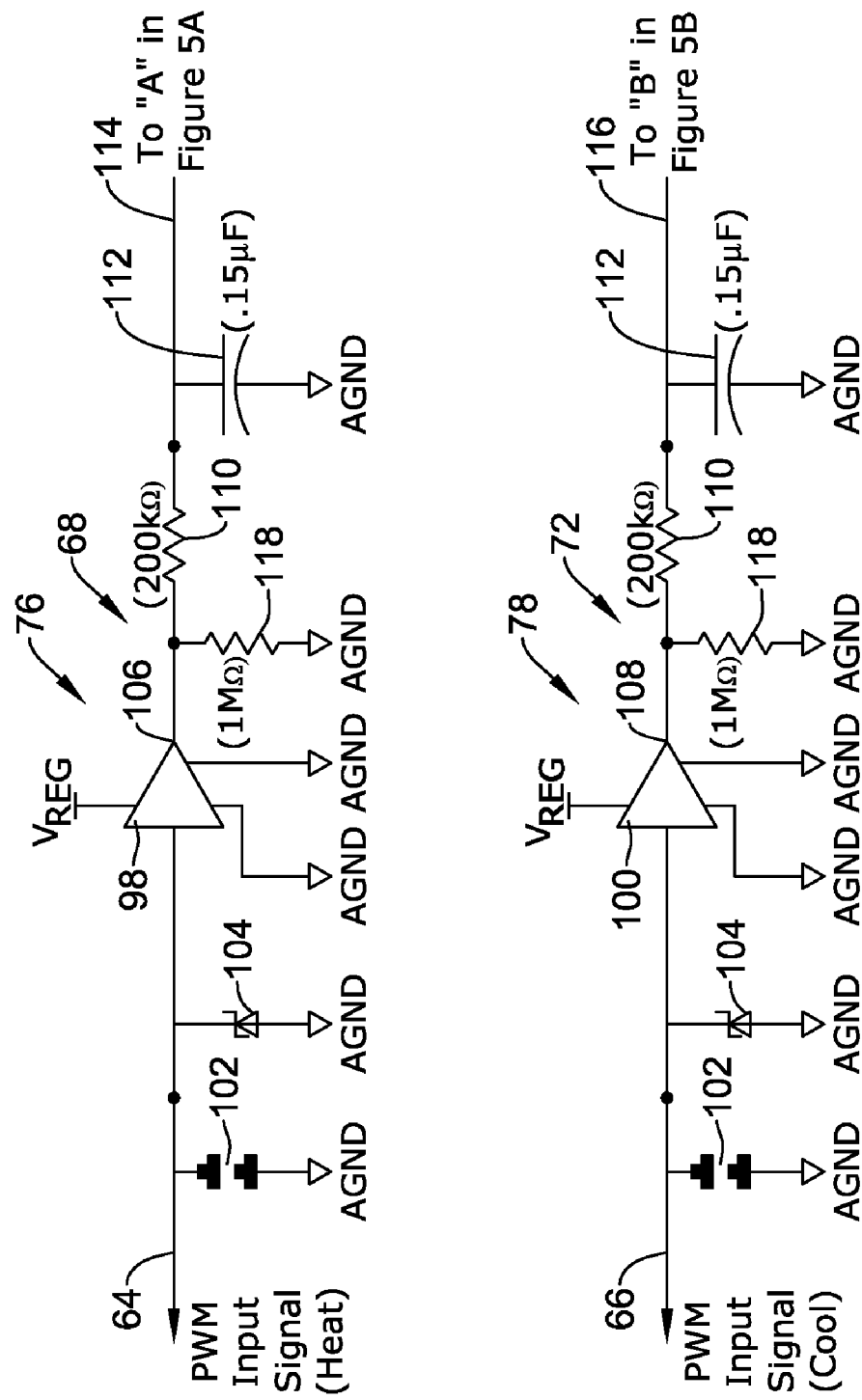
FIG. 3 is an electrical diagram showing an illustrative embodiment of the 4-20 mA modulating circuit of FIG. 2.

FIG. 3 is an electrical diagram showing an illustrative embodiment of the 4-20 mA modulating output circuits 76,78 of FIG. 2. As shown in FIG. 3, the PWM input signal 64,66 for each channel 68,72 can be fed to a corresponding buffer 98,100 (e.g. a 3-state out buffer), which receives a single, regulated voltage $V_{REG}$ that acts as a precision voltage reference for all of the channels 68,72. If desired, a spark gap switch 102 and Zener diode 104 can be provided for each channel 68,72 to aid in transient protection of the controller against electrostatic discharge and/or voltage surges.

The output 106,108 of each non-inverting buffer 98,100 can be fed through a resistor 110 and a capacitor 112, forming a low-pass filter that converts the buffer output 106,108 to a DC voltage 114,116 having a duty cycle similar to the PWM input signals 64,66. The DC voltage 114,116 may have a magnitude of between 0 to 3.5V, 0 to 5.0V, or some other desired voltage range depending on the magnitude of the reference voltage $V_{REG}$. A high-impedance resistor 118 can be provided in those instances when the controller includes a separate controller sub-base, which, in use, ensures that the modulating controller output is at or near zero when the controller cover is opened.

Figure 4:
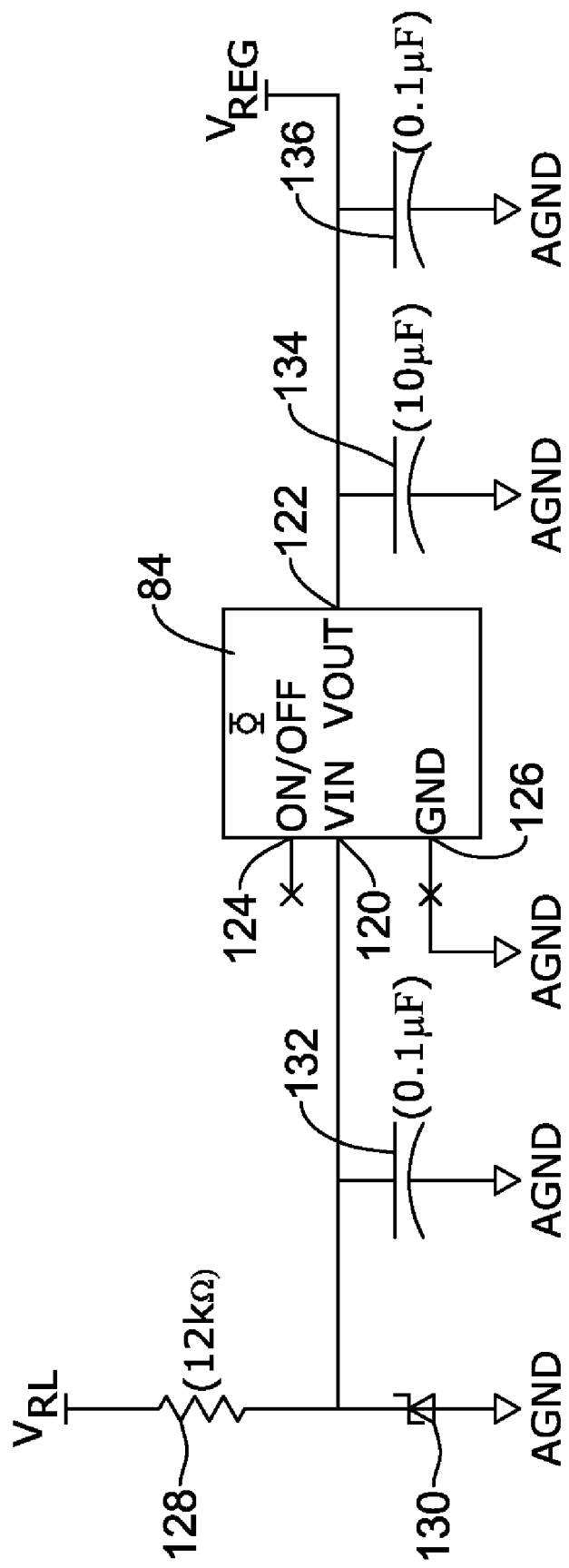
FIG. 4 is an electrical diagram showing an illustrative embodiment of the voltage regulator of FIG. 2.

FIG. 4 is an electrical diagram showing an illustrative embodiment of the voltage regulator 84 of FIG. 2. As shown in FIG. 4, the voltage regulator 84 may comprise a three-terminal positive CMOS voltage regulator having a voltage input terminal VIN 120, a voltage output terminal VOUT 122, an ON/OFF terminal 124, and a ground terminal 126. It should be understood, however, that other suitable voltage regulators such as a switching voltage regulator could be employed, if desired.

A relay voltage $V_{RL}$ fed to a resistor 128 can be used to power the voltage regulator 84. The relay voltage $V_{RL}$ may comprise, for example, a 15V switching voltage that supplies an increased voltage of 30V for 100 ms during relay pull-in as the relay switch is activated. In certain embodiments, a Zener diode 130 can be provided to protect the input to the voltage regulator 84 during the 30V relay pull-in. If desired, a number of external capacitors 132,134,136 can also be provided to filter the signal at both the input and output-sides of the voltage regulator 84.

The detection voltage of the voltage regulator 84 can be fixed internally, and can have an accuracy of equal to or less than about ±2%, although other configurations are possible. The regulated voltage $V_{REG}$ outputted at the VOUT terminal 122 can have a magnitude of 3.5 volts, 5.0 volts, or some other desired voltage. It should be understood, however, that the voltage regulator 84 can be configured to produce other voltages with different accuracies, if desired.

Figure 5A:
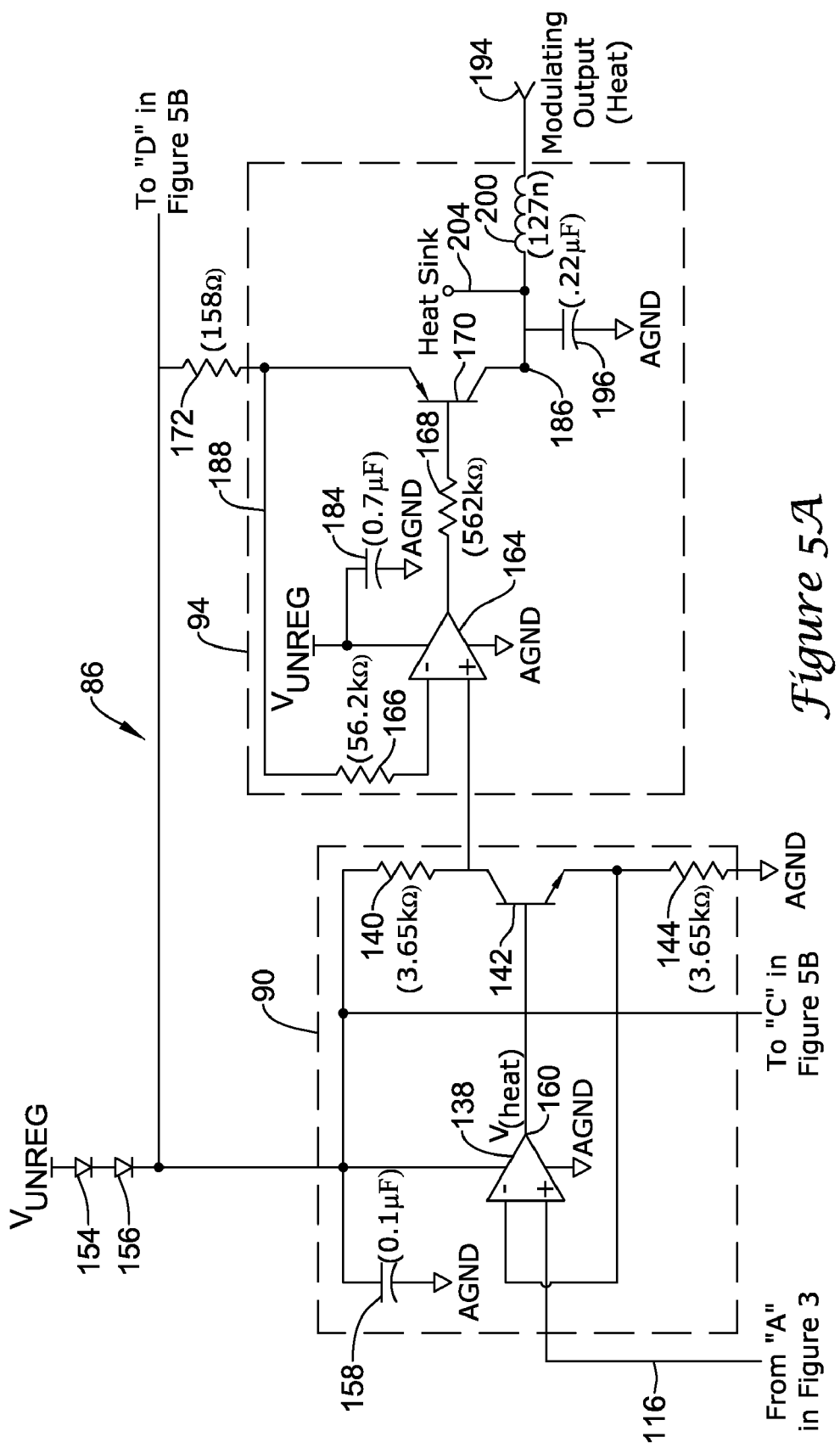
FIGS. 5A-5B are electrical diagrams showing an illustrative embodiment of the 4-20 mA modulating output drivers of FIG. 2.
Figure 5B:
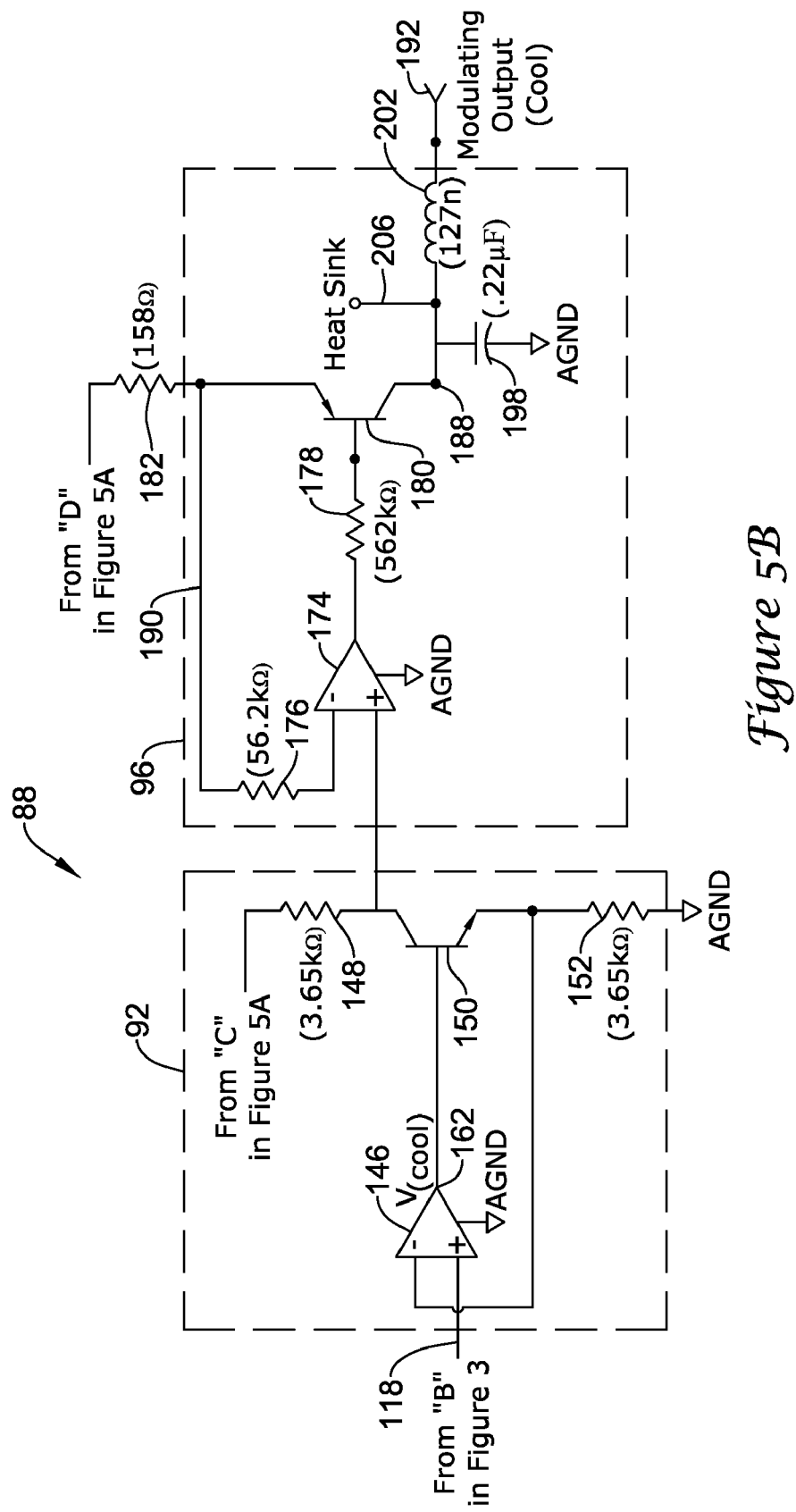

FIGS. 5A-5B are electrical diagrams showing an illustrative embodiment of the 4-20 mA modulating output drivers 86,88 of FIG. 2. As indicated by dashed lines in FIG. 5A, the first amplifier stage 90 of the first (i.e. heating) modulating output driver 86 can include an operational amplifier 138, a first high-precision resistor 140, an NPN-type transistor 142, and a second high-precision resistor 144, as shown. In similar fashion, and as further indicated by dashed lines in FIG. 5B, the first amplifier stage 92 of the second (i.e. cooling) modulating output driver 88 can include an operational amplifier 146, a first high-precision resistor 148, an NPN-type transistor 150, and a second high-precision resistor 152. An unregulated voltage $V_{UNREG}$ can be provided to power each of the operational amplifiers 138,146 as well as each of the transistors 142,150. In certain embodiments, the unregulated voltage $V_{UNREG}$ can include a filtered voltage signal, which can be fed through a series of diodes 154,156 to drop the voltage by a desired factor (e.g. 1.4) in the first amplification stage 90,92.

The operational amplifiers 138,146 can each be connected to a capacitor 158, causing the amplifiers 138,146 to function as differentiators for measuring changes in voltage across the amplifier input nodes. In the illustrative embodiment of FIGS. 5A-5B, each of the operational amplifiers 138,146 can be packaged together as a single (i.e. dual-op) amplifier, allowing all of the channels 68,72 to function using only a single voltage $V_{UNREG}$ and capacitor 158, which is illustratively shown connected to the first modulating output driver 86 in FIG. 5A. A similar configuration can be provided for each of the transistors 142,150, reducing the number of components required during assembly. It should be understood, however, that separate operational amplifiers and transistors can be provided for each of the modulating output drivers 86,88, if desired.

In use, the operational amplifiers 138,146 can be configured to output a DC voltage $V_{(HEAT)}, V_{(COOL)}$ depending on the current flow across the transistors 142,150. If, for example, a relatively high voltage of 3.5V is received at the positive input terminal of the operation amplifiers 138,146, then the resulting 3.5V signal maintained at the negative input terminal of the amplifiers 138,146 will cause the transistors 142,150 to go high, producing an increased DC voltage $V_{(HEAT)}, V_{(COOL)}$ at the output terminals 160,162 of the amplifiers 138,146. Conversely, if a relatively low voltage is received at the positive input terminal of the operational amplifiers 138,146, then the resulting low voltage at the negative input node will cause the transistors 142,150 to go low, producing a decreased DC voltage $V_{(HEAT)}, V_{(COOL)}$ at the output terminals 160,162 of the amplifiers 138,146. The magnitude of the voltages $V_{(HEAT)}, V_{(COOL)}$ outputted will typically vary between about 30V to 40V, and more specifically about 35.6V to 38.6 V, depending on the current flow across the transistors 142,150. The outputted voltage $V_{(HEAT)}, V_{(COOL)}$ may vary from these values, however, depending on the application.

The second amplification stage 94,96 of each modulating output driver 86,88 can be configured to output a 4-20 mA modulating output based on the outputted voltage received from the first amplification stage 90,92. As indicated by dashed lines in FIG. 5A, the second amplifier stage 94 of the first modulating output driver 86 may include an operational amplifier 164, a first resistor 166, a second resistor 168, a PNP-type transistor 170, and a high-precision resistor 172. In similar fashion, and as indicated by dashed lines in FIG. 5B, the second amplifier stage 96 of the second modulating output driver 88 may include an operational amplifier 174, a first resistor 176, a second resistor 178, a PNP-type transistor 180, and a high-precision resistor 182. Each of the operational amplifiers 164,174 can be powered via the same unregulated voltage $V_{UNREG}$ used by the first amplifier stage 90,92, but without the additional drop from the diodes 154,156.

As with the first amplification stage 90,92, each of the operational amplifiers 164,174 can be packaged together as a single dual-op amplifier, and can be configured to function as a differentiator using a capacitor 184, as shown. In use, the second amplification stage 94,96 can be configured to output a modulating output current based on the voltage outputted from the first amplification stage 90,92. For example, a relatively high voltage (e.g. 35V) received at the positive input terminal of the operational amplifiers 164,174 will cause the transistors 170,180 to go low, producing a high current flow (e.g. 20 mA) at nodes 186 and 188. Conversely, a relatively low voltage (e.g. 0.5V) received at the positive input node of the operational amplifiers 164,174 will cause the transistors 170,180 to go high, producing a low current flow (e.g. 4 mA) at nodes 186 and 188. The low/high current can then be outputted at terminals 192 and 194 as the 4-20 mA modulating outputs 70,74, as shown, for example, in FIG. 2. If desired, the high-precision resistors 172,182 connected to the feedback lines 188,190 of the operational amplifiers 164,174 can be utilized to take measurements of the 4-20 mA modulating outputs. In certain embodiments, a capacitor 196,198 and inductor 200,202 can be provided for each channel to filter any transients from the 4-20 mA modulating outputs.

The transistors 170,180 used in the second amplification stage 94,96 can be oversized by an order of magnitude to reduce the generation of heat within the controller housing. In some embodiments, a heat sink 204,206 can also be provided on each of the transistors 170,180 to further dissipate heat, if desired. During operation, the use of oversized transistors 170,180 and/or heat sinks 204,206 acts to maintain the overall heat increase within the controller housing at a minimum, in some cases to a level no greater than about 2° F. In certain applications, such reduction of heat generated may be necessary to ensure proper operation of the internal thermistor commonly used by many controllers for temperature sensing. In some cases, for example, the heat generated may offset the temperature and/or humidity values sensed within the interior of the controller casing, causing these measured values to stray away from the actual ambient conditions. Thus, by maintaining the heat generated at relatively low levels, the need to calibrate the device to compensate for variations in the 4-20 mA signal and/or for other conditions is reduced or eliminated, thus improving long-term system performance.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A modulating controller for providing an analog modulating output to one or more modulating components, the modulating controller comprising:
   a voltage regulator adapted to output a reference voltage;
   at least one modulating circuit adapted to convert a digital pulse-width modulated signal of the controller into an analog precision-controlled amplitude signal, each modulating circuit including a buffer operatively coupled to the reference voltage; and
   a modulating output driver for receiving the analog precision-controlled amplitude signal and for providing an analog modulating output to the one or more modulating components.

2. The modulating controller of claim 1, wherein said at least one modulating circuit comprises a plurality of modulating circuits each defining a separate channel of the modulating controller.

3. The modulating controller of claim 2, wherein said reference voltage comprises a single reference voltage applied to two or more channels of the modulating controller.

4. The modulating controller of claim 1, wherein said voltage regulator is a CMOS voltage regulator.

5. The modulating controller of claim 1, wherein said voltage regulator has an accuracy of ±5% or less.

6. The modulating controller of claim 1, wherein said voltage regulator has an accuracy of ±2% or less.

7. The modulating controller of claim 1, wherein said buffer is a voltage level shifting buffer.

8. The modulating controller of claim 1, wherein the analog precision-controlled amplitude signal outputted from each modulating circuit has an accuracy of about ±2%.

9. The modulating controller of claim 1, wherein the analog precision-controlled amplitude signal outputted from each modulating circuit has an accuracy of ±2% or less.

10. The modulating controller of claim 1, wherein each modulating output driver includes a multi-stage amplifier.

11. The modulating controller of claim 10, wherein said multi-stage amplifier includes a first stage amplifier and a second stage amplifier.

12. The modulating controller of claim 1, wherein said modulating output is a 4-20 mA modulating output.

13. The modulating controller of claim 1, wherein said modulating controller includes a controller sub-base.

14. A modulating controller for providing an analog modulating output to one or more modulating components, the modulating controller comprising:
   a voltage regulator adapted to output a single reference voltage;
   a plurality of modulating circuits each defining a separate channel of the modulating controller, each modulating circuit including a buffer adapted to receive the reference voltage from said voltage regulator for converting a digital pulse-width modulated signal of the controller into an analog precision-controlled amplitude signal; and
   a modulating output driver for receiving the analog precision-controlled amplitude signal and for providing an analog modulating output to the one or more modulating components.

15. An apparatus for providing an analog modulating output, comprising:
   a voltage regulator adapted to output a single reference voltage;
   one or more modulating circuits having the single reference voltage as a supply voltage, each modulating circuit adapted to convert a digital pulse-width modulated signal into an analog modulating signal; and
   a modulating output driver for receiving the analog modulating signal and for providing an analog modulating output based on each modulating signal.

16. The apparatus of claim 15, wherein said voltage regulator is a CMOS voltage regulator.

17. The apparatus of claim 15, wherein at least one of said modulating circuits is non-inverting.

18. The apparatus of claim 15, wherein at least one of said modulating circuits performs a voltage level shift.

19. The apparatus of claim 15, wherein the analog modulating output is an analog 4-20 mA modulating output.

20. A method of producing an analog modulating output from a digital pulse-width modulated signal outputted by a controller, the method comprising the steps of:
   providing a modulating circuit including a buffer operatively coupled to a reference voltage;
   buffering the digital pulse-width modulated signal using the buffer and reference voltage to produce an analog precision-controlled amplitude signal; and
   amplifying the analog precision-controlled amplitude signal and outputting an analog modulating output to one or more modulating components.

* * * * *